April 9, 1957  J. H. HAMMOND, JR  2,788,282
THERMAL INDICATORS
Filed June 11, 1954

INVENTOR.
JOHN HAYS HAMMOND, JR
BY
ATTORNEY

United States Patent Office 2,788,282
Patented Apr. 9, 1957

2,788,282

THERMAL INDICATORS

John Hays Hammond, Jr., Gloucester, Mass.

Application June 11, 1954, Serial No. 436,158

4 Claims. (Cl. 99—192)

This invention relates to thermal indicators and more particularly to an indicator for frozen foods and the like the reading of which is proportional to the total amount of heat, which is absorbed from the surrounding medium above a prescribed temperature.

An object of the invention is to provide an improved telltale device for frozen foods or the like which indicates the amount of thawing or heating to which the food has been subjected.

There are many substances including for example foods, blood plasma, serums, and vaccines which may be preserved for long periods of time in good condition provided the temperature is maintained below some particular value which may be different for different substances. For example, quickly frozen foods remain palatable and wholesome if maintained below 10° F. On the other hand, ice cream may be preserved in good condition if the temperature does not rise above 32° F. although a lower temperature is desirable.

If during the distribution of food to vendors, the temperature of the food or other product rises much above the particular temperature which is suited for best preservation the food may become inferior in quality, or even harmful.

Of more importance is the question of whether or not the food has, through accident or neglect, been allowed to thaw and has thereafter been refrozen. If the period of thawing has been short the only effect, if any, may be to render the food less palatable because of the formation of large ice crystals and the consequent breaking of the fibres of the food. The food may still be saleable if the period of thawing is short. If the temporary thawing is repeated (or if a single thawing is prolonged) the food rapidly deteriorates and a prolonged exposure to thawing temperatures may result in bacterial growth in the food and possibly in serious food poisoning.

The purchaser of frozen food packages ordinarily is unable to know whether the food has been well preserved or is poor in quality or even dangerous.

The present invention provides a single, inexpensive, and easily used telltale device which does not indicate danger when exposed to a very short temperature rise which results in only slight surface thawing, but does give an indication when the thawing is sufficiently prolonged to cause food damage. It also gives an indication if the food has been repeatedly thawed for short intervals. Furthermore, the indicator may be made to respond when the temperature rises for a significant period above any assigned value, as for example 10° F. or 32° F.

The indicator is inexpensive to manufacture, is reliable in operation, is simple to set and may be made so that it cannot be reset after being sealed. The indicator operates in any position.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which:

In the following description parts will be identified by specific names for convenience, but they are intended to be as generic in their application to similar parts as the art will permit.

Figure 1:
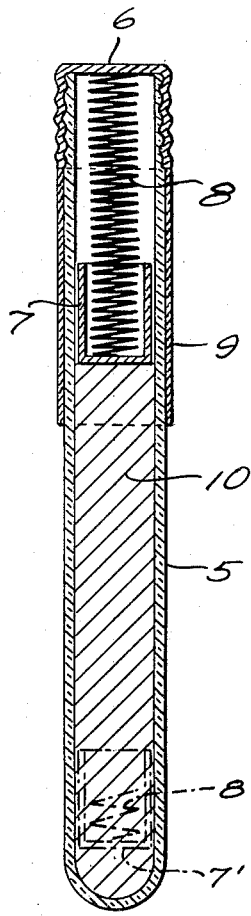
Fig. 1 is a longitudinal section illustrating one embodiment of the invention.

Referring to Fig. 1, a transparent tubular container 5 made of glass or any suitable plastic material is closed at one end and is provided at its other end with a cap 6 which is threaded onto the container. A piston 7, made of thin metal or of any suitable plastic, and preferably colored red, loosely fits the inside of the container 5 so that it can slide without appreciable friction throughout the length of the container. A coiled spring 8, made of a non-rusting metal such as brass, exerts a force on piston 7 such that when there is no obstruction in the container the piston 7 will be forced to the fully advanced position 7' at the closed end of the container. A paper 9, is pasted around the container 5, covering approximately one half of the container and concealing the piston 7 when the piston is in its fully retracted position.

Figure 2:
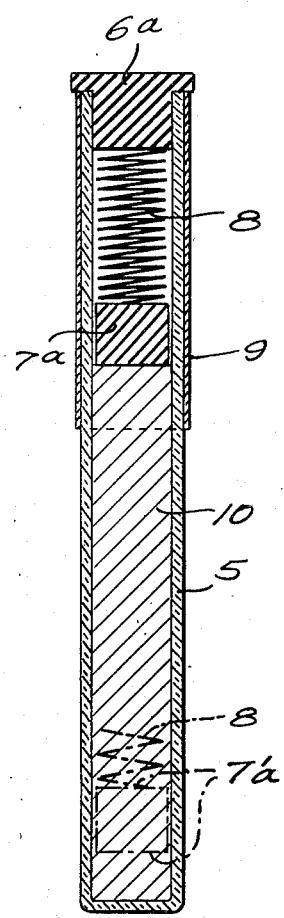
Fig. 2 is a similar longitudinal section illustrating another embodiment of the invention.

Fig. 2 shows a form of the invention with modified forms of closure and piston. The closure in Fig. 2 is in the form of a stopper 6a, made of rubber or other suitable plastic, fits closely in the inside of the container 5 so that it is securely held in place by friction. The piston 7a is here shown as a solid cylindrical piece of rubber or plastic, preferably colored red, which can slide freely inside the container 5 to position 7'a.

The operation of the invention shown in Figs. 1 and 2 is as follows: Water, to which may be added alcohol, salt, or other chemical substance in amount sufficient to depress the melting temperature of the mixture to any prescribed value below 32° F., fills the container 5 to the level of the lower edge of the paper, or about the lower half of the container. This mixture 10 is frozen while the container is supported in an upright position. The upper surface of the frozen mixture will extend above the lower edge of the paper a sufficient distance to conceal the piston 7. The piston 7 or 7a and spring 8 are then inserted and the cap 6 or 6a affixed.

For some purposes, where it is desired to prevent resetting of the device, the cap 6 or 6a may be sealed in any suitable way, as for example, by glue or a chemical which will bond the cap 6 or 6a and container 5 firmly together. Suitable instructions and the temperature at which the mixture 10 melts, may be printed on the paper 9.

The indicator, thus set and chilled to a temperature much below the melting temperature of the mixture 10, is inserted in the packaged food just prior to the quick freezing of the package. The indicator is preferably mounted behind a transparent window so that it can be easily viewed.

So long as the red piston is not visible below the paper 9, the purchaser of the package is assured that the package has not been exposed to temperatures higher than that stamped on the paper 9 for more than a few minutes. An exposure to temperatures above the melting point of the mixture 10 for more than a few minutes will cause the piston 7 to appear and progress down the tube a distance generally proportional to the time during which the mixture is melted. The tube could be marked to indicate time of melting, or the degree of damage to the food. Repeated short melting periods are indicated also by the added or integrated motion of the piston. As an example, if the package is removed from the freezing zone to a zone having an ambient temperature above the melting point of the mixture for a short time only melting will occur mostly at the surface of the piston 7 where the pressure from the spring 8 is greatest, the piston will move a distance roughly proportional to the time during which the package is exposed to melting temperature.

A subsequent exposure for a longer period of time or to a higher ambient temperature will cause an additional melting of the mixture 10 and a consequent additional displacement of the piston 7.

The initial displacement of the piston may be insufficient to move the piston 7 below the paper covering 9 and hence may be immaterial so far as any effect upon the value of the food product. However, a prolonged intense thawing would cause a larger displacement of the piston 7 and this would indicate possible damage to the food.

Figure 3:
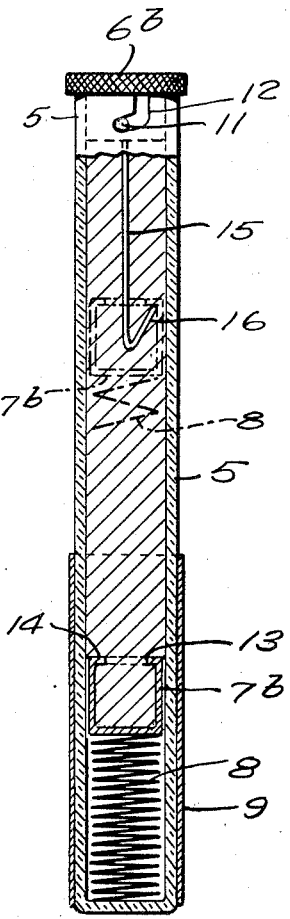
Fig. 3 is a view partly in section showing a further modification of the invention.

Fig. 3 shows a form of the invention in which the method of operation is somewhat different from that of the invention shown in Figs. 1 and 2.

In Fig. 3 the container 5 may be the same as for the device in Fig. 1 or 2. It is shown as a transparent glass or plastic container, closed at one end and provided at the other with a stopper 6b held in place by a pin 11 in the stopper which engages a slot 12 in the container 5. A stopper of the type shown in Fig. 1 or Fig. 2 or any other suitable form of stopper may be used in the device of Fig. 3. The piston 7b in Fig. 3 is made of magnetic material such as iron and is cylindrical in shape with a round opening 13 in one end. It is provided with a lip 14 at this open end. The piston 7b is preferably colored red. The spring 8 exerts a force to push the piston 7b toward the stopper. A paper coating 9 covers approximately half of the container so as to obscure the view of piston 7b when the spring is compressed. A wire 15, the end of which is turned back to form a hook 16, is affixed to the stopper 6b. When the piston 7b moves toward the stopper, the hook 16 passes through the hole in piston 7 and snaps under the lip 14 thus holding the piston 7b and preventing any motion of the piston after once being engaged with the hook.

The operation of the form of the invention shown in Fig. 3 is as follows: Water, containing a chemical to depress the freezing point if desired, is poured into the container to such a level that when frozen the entire tube is filled with the solid solution up to the under surface of the stopper. During the freezing of the liquid 10, the piston 7b is held in its lower position against the pressure from the spring 8 by a magnetic field not shown. The stopper 6b and wire 15 are inserted before freezing and the stopper sealed if desired.

As melting of the solid solution 10 progresses the piston 7b moves progressively toward the stopper, appearing from behind the paper only after a certain time has elapsed. The motion of the piston is quantitatively related to time and rate of melting as previously explained. When practically all of the mixture 10 is melted the piston 7b engages with the hook 16 and cannot subsequently be pulled down to the original position shown in Fig. 3. Thus the device cannot be reset.

Although only a few of the various forms in which this invention may be embodied have been shown herein, it is to be understood that the invention is not limited to any specific construction but may be embodied in various forms without departing from the spirit of the invention as defined by the appended claims.

What is claimed is:

1. An indicator for frozen food, comprising an elongated transparent container to be embodied in the food package in a visible position, a piston slidable in said container, a spring in said container biased to urge said piston to a fully advanced position, and a mass of frozen material having a melting point not greater than that of the frozen food held in said container and due to its frozen state holding said piston in full retracted position with said spring compressed, and a non-transparent cover concealing the piston from view through said transparent container when in said fully retracted position, said spring being adapted to advance said piston into view beyond said non-transparent cover and to advance slowly to fully advanced position when said material is melted, whereby the displacement of the piston is an indication of the time of exposure of the food to melting temperature.

2. An indicator as set forth in claim 1 in which said container is sealed to prevent resetting of said piston after the same has been advanced by said spring.

3. An indicator as set forth in claim 1 in which said piston is made of magnetic material to be held retracted magnetically during the freezing of said mass.

4. An indicator as set forth in claim 3 having latching means to hold said piston against resetting after said frozen material has melted.

References Cited in the file of this patent
UNITED STATES PATENTS 2,460,215     Chase     Jan. 25, 1949